(12) United States Patent
Corscadden et al.

(10) Patent No.: US 9,200,211 B2
(45) Date of Patent: Dec. 1, 2015

(54) LOW COMPLEXITY, HIGH YIELD CONVERSION OF HEAVY HYDROCARBONS

(75) Inventors: Tom Corscadden, Calgary (CA); Greg Diduch, Calgary (CA); Damien Hocking, Calgary (CA); Darius Remesat, Calgary (CA); Jim Kearns, Calgary (CA)

(73) Assignee: MEG ENERGY CORP., Calgary (CA)

( * ) Notice: Subject to any disclaimer, the term of this patent is extended or adjusted under 35 U.S.C. 154(b) by 774 days.

(21) Appl. No.: 13/351,767

(22) Filed: Jan. 17, 2012

(65) Prior Publication Data

US 2013/0180888 A1  Jul. 18, 2013

(51) Int. Cl.
*C10G 21/00* (2006.01)
*C10G 55/04* (2006.01)

(52) U.S. Cl.
CPC .............. *C10G 21/003* (2013.01); *C10G 55/04* (2013.01); *B01J 2219/00006* (2013.01)

(58) Field of Classification Search
CPC .......... C10G 9/007; C10G 9/14; C10G 55/04; C10G 2300/44; C10G 1/045
See application file for complete search history.

(56) References Cited

U.S. PATENT DOCUMENTS

| | | |
|---|---|---|
| 2,850,431 A | 9/1958 | Smith |
| 3,005,769 A | 10/1961 | Garwin |
| 3,053,751 A | 9/1962 | Garwin |
| 3,318,804 A | 5/1967 | Van Pool et al. |
| 3,516,928 A | 6/1970 | King et al. |
| 3,714,033 A | 1/1973 | Somekh et al. |
| 3,714,034 A | 1/1973 | Kosseim et al. |
| 3,847,751 A | 11/1974 | Godino et al. |
| 3,968,023 A | 7/1976 | Yan |
| 4,017,383 A | 4/1977 | Beavon |
| 4,088,540 A | 5/1978 | Bunas |
| 4,125,458 A | 11/1978 | Bushnell et al. |
| 4,191,636 A | 3/1980 | Fukui et al. |
| 4,233,138 A | 11/1980 | Rollmann et al. |
| 4,239,616 A | 12/1980 | Gearhart |
| 4,260,476 A | 4/1981 | Vidueira et al. |
| 4,278,529 A | 7/1981 | Gearhart |
| 4,389,302 A | 6/1983 | Garwin et al. |
| 4,421,639 A | 12/1983 | Lambert et al. |
| 4,428,824 A * | 1/1984 | Choi et al. ...................... 208/86 |

(Continued)

FOREIGN PATENT DOCUMENTS

CA        2455149 A1    6/2004

OTHER PUBLICATIONS

Golden and Bartletta, Designing Vacuum Units (for Canadian heavy crudes) Petroleum Technology Quarterly, Q2, 2006, pp. 105.

(Continued)

*Primary Examiner* — Randy Boyer
*Assistant Examiner* — Juan Valencia
(74) *Attorney, Agent, or Firm* — Bennett Jones LLP

(57) ABSTRACT

A process for producing pipeline-ready or refinery-ready feedstock from heavy hydrocarbons using a high-performance solvent extraction process with high local solvent-to-process fluid ratios yet maintaining low overall solvent-to-process fluid ratios, by first performing mild thermal cracking on the heavy hydrocarbons and then separating asphaltene-rich fractions from a resulting thermally affected fluid so that the high solvent-to-oil ratio portion of the process acts only on those asphaltene-rich fractions, and producing a dry, solid asphaltene as an end-product.

11 Claims, 4 Drawing Sheets

(56) References Cited

U.S. PATENT DOCUMENTS

| | | |
|---|---|---|
| 4,454,023 A * | 6/1984 | Lutz .................. 208/96 |
| 4,482,453 A | 11/1984 | Coombs et al. |
| 4,528,100 A | 7/1985 | Zarchy |
| 4,530,754 A | 7/1985 | Shiroto et al. |
| 4,572,781 A * | 2/1986 | Krasuk et al. .................. 208/309 |
| 4,640,762 A | 2/1987 | Woods et al. |
| 4,673,485 A | 6/1987 | Bristow et al. |
| 4,686,028 A | 8/1987 | Van Driesen et al. |
| 4,767,521 A | 8/1988 | Feldman et al. |
| 4,773,986 A | 9/1988 | Feldman et al. |
| 4,778,586 A | 10/1988 | Bain et al. |
| 4,810,367 A | 3/1989 | Chombart et al. |
| 4,818,371 A | 4/1989 | Bain et al. |
| 4,846,958 A | 7/1989 | Feldman et al. |
| 4,940,529 A | 7/1990 | Beaton et al. |
| 4,994,172 A | 2/1991 | Buchanan et al. |
| 5,008,085 A | 4/1991 | Bain et al. |
| 5,009,772 A | 4/1991 | Nelson et al. |
| 5,013,427 A | 5/1991 | Mosby et al. |
| 5,124,025 A | 6/1992 | Kolstad et al. |
| 5,124,026 A | 6/1992 | Taylor et al. |
| 5,124,027 A | 6/1992 | Beaton et al. |
| 5,188,709 A | 2/1993 | Kuerston et al. |
| 5,192,421 A | 3/1993 | Audeh et al. |
| 5,228,978 A | 7/1993 | Taylor et al. |
| 5,242,578 A | 9/1993 | Taylor et al. |
| 5,258,117 A | 11/1993 | Kolstad et al. |
| 5,601,697 A * | 2/1997 | Miller et al. .................. 208/45 |
| 5,635,055 A | 6/1997 | Sweet et al. |
| 5,795,464 A | 8/1998 | Sankey et al. |
| 5,919,355 A | 7/1999 | Hood |
| 5,932,090 A | 8/1999 | Marachionna et al. |
| 5,976,360 A * | 11/1999 | Blum et al. .................. 208/263 |
| 5,976,361 A | 11/1999 | Hood et al. |
| 6,183,627 B1 | 2/2001 | Friday et al. |
| 6,210,560 B1 | 4/2001 | Wiehe et al. |
| 6,274,003 B1 | 8/2001 | Friday et al. |
| 6,274,032 B2 | 8/2001 | Hood et al. |
| 6,357,526 B1 | 3/2002 | Abdel-Halim et al. |
| 6,533,925 B1 | 3/2003 | Wallace et al. |
| 6,972,085 B1 | 12/2005 | Brecher et al. |
| 7,297,250 B2 | 11/2007 | Bronicki |
| 7,381,320 B2 | 6/2008 | Iqbal et al. |
| 7,582,204 B2 | 9/2009 | Gueret et al. |
| 7,585,407 B2 | 9/2009 | Duyvesteyn et al. |
| 7,597,794 B2 | 10/2009 | Zhao et al. |
| 7,691,256 B2 | 4/2010 | Montanari et al. |
| 7,718,839 B2 | 5/2010 | Baumgartner et al. |
| 7,749,378 B2 | 7/2010 | Iqbal et al. |
| 7,758,746 B2 | 7/2010 | Yeggy et al. |
| 7,799,207 B2 | 9/2010 | Allinson et al. |
| 7,837,859 B2 | 11/2010 | Ou et al. |
| 7,867,385 B2 | 1/2011 | Yeggy et al. |
| 7,964,090 B2 | 6/2011 | Iqbal |
| 7,976,695 B2 | 7/2011 | Brecher |
| 8,048,291 B2 * | 11/2011 | Subramanian et al. ......... 208/86 |
| 2001/0002654 A1 | 6/2001 | Hood et al. |
| 2003/0089636 A1 | 5/2003 | Marchionna et al. |
| 2003/0129109 A1 | 7/2003 | Bronicki |
| 2004/0163996 A1 * | 8/2004 | Colyar .................. 208/86 |
| 2006/0032789 A1 | 2/2006 | Bronicki |
| 2006/0272982 A1 | 12/2006 | Montanari et al. |
| 2007/0125686 A1 | 6/2007 | Zheng et al. |
| 2008/0083652 A1 | 4/2008 | Morel et al. |
| 2008/0093259 A1 | 4/2008 | Brecher |
| 2009/0101540 A1 | 4/2009 | Marchionna et al. |
| 2009/0166253 A1 | 7/2009 | Subramanian et al. |
| 2009/0166254 A1 * | 7/2009 | Subramanian et al. ......... 208/67 |
| 2010/0243518 A1 | 9/2010 | Zimmerman et al. |
| 2010/0300934 A1 | 12/2010 | Marchionna et al. |
| 2011/0005970 A1 | 1/2011 | Ou et al. |
| 2011/0017642 A1 | 1/2011 | Duyvesteyn |
| 2011/0028573 A1 | 2/2011 | Hassan et al. |
| 2011/0215030 A1 * | 9/2011 | Corscadden .................. 208/97 |
| 2011/0266198 A1 | 11/2011 | Hassan et al. |
| 2013/0081325 A1 | 4/2013 | Corscadden et al. |
| 2013/0098735 A1 | 4/2013 | Corscadden et al. |
| 2013/0180888 A1 | 7/2013 | Corscadden et al. |

OTHER PUBLICATIONS

Beuther et al., "Thermal Visbreaking of Heavy Residues", The Oil and Gas Journal. 57:46, Nov. 9, 1959, pp. 151-157.

Rhoe et al., "Visbreaking: A Flexible Process", Hydrocarbon Processing, Jan. 1979, pp. 131-136.

Golden and Barletta, "Designing Vacuum Units" (for Canadian heavy crudes), Petroleum Technology Quarterly, Q2, 2006, pp. 105-110.

R. Ulrich et al., "Application of the Rotating Disk Method to the Study of Bitumen Dissolution into Organic Solvents", Canadian Journal of Chemical Engineering, vol. 69, Aug. 1991.

* cited by examiner

LOW COMPLEXITY, HIGH YIELD CONVERSION OF HEAVY HYDROCARBONS

FIELD OF THE INVENTION

The present invention relates to an optimized method of improving a heavy hydrocarbon, such as bitumen, to a lighter more fluid product and, more specifically, to a final hydrocarbon product that is refinery-ready and meets pipeline transport criteria without the addition of diluent. A solid asphaltene by-product is created for easy handling and further processing. The invention is targeted to enhance Canadian bitumen, but has general application in improving any heavy hydrocarbon.

BACKGROUND OF THE INVENTION

A low complexity, high yield integrated process has been developed, tested and enhanced to improve the viability and economics of converting heavy viscous hydrocarbons into desired refinery feedstock. The concept for this integrated process has been previously described in U.S. patent application Ser. No. 13/037,185 and U.S. patent application Ser. No. 13/250,935, and has been validated through pilot plant (5 BPD) and demonstration scale (1500 BPD) facilities. Improvements to the integrated process through shear mixing have been disclosed in U.S. patent application Ser. No. 61/548,915.

This invention describes the optimal operating conditions to achieve the lowest complexity and highest yield for the described integrated process. The integrated process operates at temperatures, pressures, heat fluxes, residence times, sweep gas rates and solvent to oil ratios outside any open art processes. The reduced capital and operating costs with the high liquid product yield for this novel integrated process, from the novel combination of all these conditions, and choices of solvent, make it a high return opportunity for any heavy oil producers.

DESCRIPTION OF PRIOR ART

Processes have been disclosed to convert and/or condition Oil Sands bitumen into pipeline transportable and refinery acceptable crude. Of note, thermal cracking, catalytic cracking, solvent deasphalting and combinations of all three (for example, visbreaking and solvent deasphalting) have been proposed to convert bitumen to improve its characteristics for transport and use as a refinery feedstock.

Thermal Cracking

Visbreaking or viscosity breaking, a form of thermal cracking, is a well known petroleum refining process in which heavy and/or reduced crudes are pyrolyzed, or cracked, under comparatively mild conditions to provide products that have lower viscosities and pour points, thus reducing required amounts of less-viscous- and increasingly costly to obtain blending hydrocarbons known as diluent to improve fluidity of the crude, and make the crude meet minimum transport pipeline specifications (minimum API gravity of 19).

There are two basic visbreaking configurations, the coil-only visbreaker and the coil-and-soak visbreaker. Both require heaters to heat the crude, with the coil-only style employing cracking only in the heater tubes. Coil-only visbreakers operate at about 900° F. at the heater outlet with a residence time of about 1 minute. Gas oil is recycled to quench the reaction. In the coil-and-soak visbreaker, a vessel is used at the outlet of a furnace to provide additional residence time for cracking of the crude. The crude sits and continues to crack/react as the temperature slowly reduces. The coil-and-soak visbreaker runs at heater outlet temperatures of 800° F. The soaker drum temperature reduces down to 700° F. at the outlet with aggregate residence times of over 1 hour.

Examples of such visbreaking methods are described in Beuther et al., "Thermal Visbreaking of Heavy Residues", The Oil and Gas Journal. 57:46, Nov. 9, 1959, pp. 151-157; Rhoe et al., "Visbreaking: A Flexible Process", Hydrocarbon Processing, January 1979, pp. 131-136; and U.S. Pat. No. 4,233,138. The yield structure is approximately same for either configuration: 1-3% light ends, 5% (wt) naphtha and 15% (vt) gas oil. The remainder remains as heavy oil or bitumen. The products are separated in a distillation column for further processing or blending.

A concern with standard visbreaking schemes is that for Canadian Bitumen, the operating temperatures are above the limit (around 700° F.-720° F.) where significant coking impacts operability (Golden and Bartletta, Designing Vacuum Units (for Canadian heavy crudes), Petroleum Technology Quarterly, Q2, 2006, pp. 105). In addition, heat is added over a short period of time in the heater, so local heat fluxes are not uniform and can peak well above coking initiation limits; and the heat is not maintained consistently allowing for condensation reactions to occur. Attempting to apply conventional visbreaking to Canadian Bitumen is limited due to the propensity for coking and inability of these systems to manage this issue.

In the first part of U.S. Pat. No. 6,972,085 and in U.S. Pat. No. 7,976,695 an attempt is made to address the desire for a constant and sustained application of heat to the crude over an extended period of time. Essentially, the heater and the holding vessel are merged into one vessel to create a continuous heated bath for the crude. Multiple heating levels are applied to the crude at various times. This is an improvement over standard visbreaking but does not eliminate hot spots within the processed crude, permitting coking due to temperature peaks above optimal levels for cracking.

Combination of Thermal/Catalytic Cracking and Solvent Deasphalting

In U.S. Pat. No. 4,454,023 a process for the treatment of heavy viscous hydrocarbon oil is disclosed, the process comprising the steps of: visbreaking the oil; fractionating the visbroken oil; solvent deasphalting the non-distilled portion of the visbroken oil in a two-stage deasphalting process to produce separate asphaltene, resin, and deasphalted oil fractions; mixing the deasphalted oil ("DAO") with the visbroken distillates; and recycling and combining resins from the deasphalting step with the feedstock initially delivered to the visbreaker. The U.S. '023 patent provides a means for upgrading lighter hydrocarbons (API gravity>15) than Canadian Bitumen but is burdened by the misapplication of the thermal cracking technology that will over-crack and coke the hydrocarbon stream, and by the complexity and cost of a two-stage solvent deasphalting system to separate the resin fraction from the deasphalted oil. In addition, the need to recycle part of the resin stream increases the operating costs and complexity of operation.

In U.S. Pat. No. 4,191,636, heavy oil is continuously converted into asphaltenes and metal-free oil by hydrotreating the heavy oil to crack asphaltenes selectively and remove heavy metals such as nickel and vanadium simultaneously. The liquid products are separated into a light fraction of an asphaltene-free and metal-free oil and a heavy fraction of an asphaltene- and heavy metal-containing oil. The light fraction is recovered as a product and the heavy fraction is recycled to the hydrotreating step. Catalytic conversion of Canadian heavy bitumen (API gravity<10) using this U.S. Pat. No. '636 process is a high-intensity process that tends to have reliability issues with rapid catalyst deactivation impacting selectivity and yield.

In U.S. Pat. No. 4,428,824, a solvent deasphalting unit is installed upstream of a visbreaking unit to remove the asphaltenes from the visbreaking operation. In this configuration, the visbreaking unit can now operate at higher temperatures to convert the heavier molecules to lighter hydrocarbon molecules without fouling, since the asphaltenes are removed from the product stream entirely. However, the yield of the bitumen is greatly reduced (by 10-15%) since the early removal of the asphaltenes in the process prevents thermal conversion of this portion of the crude into a refinable product.

As in U.S. Pat. No. 4,428,824, U.S. Pat. No. 6,274,032, disclosed a process for treating a hydrocarbon feed source comprising a fractionator to separate the primary crude components, followed by a Solvent Deasphalting (SDA) unit to work on the heavier crude asphaltene rich component, and a mild thermal cracker for the non-asphaltene stream. The asphaltene rich stream is processed in a gasification unit to generate syngas for hydrogen requirements. Placing an SDA unit upstream of a thermal cracker reduces the overall yield of the bitumen as refinery feed, since the asphaltene portion of the crude, comprising up to 15% of Canadian bitumen, is removed from consideration for inclusion in some format as crude. This loss in product yield is not compensated for by the increased cracking in the visbreaker.

In U.S. Pat. No. 4,686,028 a process for the treatment of whole crude oil is disclosed, the process comprising the steps of deasphalting a high boiling range hydrocarbon in a two-stage deasphalting process to produce separate asphaltene, resin, and deasphalted oil fractions, followed by upgrading only the resin fraction by hydrogenation or visbreaking. The U.S. Pat. No. 4,686,028 invention applies visbreaking to a favourable portion of the whole crude stream to minimize coke generation. However, U.S. Pat. No. '028 is limited by missing a large part of the crude that could benefit from optimal conversion and thus a large portion of the crude does not end up as pipeline product without the need of transport diluent.

In U.S. Pat. No. 5,601,697 a process is disclosed for the treatment of topped crude oil, the process comprising the steps of vacuum distilling the topped crude oil, deasphalting the bottoms product from the distillation, catalytic cracking of the deasphalting oil, mixing distillable catalytic cracking fractions (atmospheric equivalent boiling temperature of less than about 1100 degrees F.) to produce products comprising transportation fuels, light gases, and slurry oil. U.S. Pat. No. '697 is burdened by the complexity, cost, and technical viability of vacuum distilling a topped heavy crude to about 850° F. and catalytic cracking the deasphalted oil to produce transportation fuels.

In U.S. Pat. No. 6,533,925, a process is described involving the integration of a solvent deasphalting process with a gasification process and an improved process for separating a resin phase from a solvent solution comprising a solvent, deasphalted oil (DAO) and resin. A resin extractor with the solvent elevated in temperature above that of the first asphaltene extractor is included in the U.S. Pat. No. '925 invention. The asphaltene stream is treated but removed prior to any thermal conversion eliminating the possibility of obtaining a value uplift into useable refinery feedstock. The impact is a reduction in the potential overall yield of the crude stream.

In U.S. Patent application 2007/0125686, a process is disclosed where a heavy hydrocarbon stream is first separated into various fractions via distillation with the heavy component sent to a mild thermal cracker (visbreaker). The remaining heavy liquid from the mild thermal cracker is solvent deasphalted in an open art SDA unit. The asphaltenes separated from the SDA are used as feed to a gasifier. The deasphalted oil is blended with the condensed mild thermal cracker vapour to form a blended product. As stated with U.S. Pat. No. '023 above, visbreaking faces the challenges of early coke generation. Specifically, the '686 patent application explains that the intent of this mild thermal cracker is to crack the non-asphaltene material exclusively, which is also not practical with Canadian bitumen. In this application, the mild thermal cracker operates at elevated pressures unnecessarily increasing coke formation, and thus yield. In addition, additional energy is required in the distillation and extraction steps with most of the separated components being recombined for pipeline transport.

In U.S. Pat. No. 8,048,291, a process is described where the bottoms from an atmospheric column and/or vacuum column is treated in a solvent deasphalting unit and then by some form of thermal or catalytic cracking. The objective of this patent is to reduce the cost of cracking the DAO stream by putting an SDA upstream of the cracker. The multiple extraction steps and operating conditions of the SDA increase the cost of the entire process offsetting some of the savings from a smaller cracking unit, with the integrated process providing a lower overall yield unless significant costs are incurred to add hydrogen to increase yield. The SDA unit removes the heavy asphaltenes which comprised over 15% of heavy bitumen streams, thus limiting overall yield to less than 85% unless expensive catalytic processes are employed. The overall result of this process is uneconomic with the limit of feed being processed being greater than 5 API through the SDA.

Treatment of SDA Generated Asphaltene-Rich Stream

In U.S. Pat. No. 4,421,639 a solvent deasphalting process uses a $2^{nd}$ asphalt extractor to concentrate asphaltene material (and recovery of more deasphalted oil). The concentrated asphalt stream is sent through a heater to get to 425° F. at 18 psia and uses a flash drum and stream stripper to separate solvent (in this case propane) from the asphalt stream. Asphalt product, in liquid form, is pumped to storage. This arrangement only works if the asphalt rich stream is liquid at these conditions. It is burdened by plugging if any appreciably solid asphaltenes are present as in asphaltene-rich streams like bitumen.

In U.S. Pat. No. 3,847,751, the concentrated asphaltene product from the SDA unit is mixed with solvent to transport as a liquid solution to a spray dryer. The spray nozzle design and pressure drop dictates the size of liquid droplets that are formed. The smaller the light hydrocarbon (solvent) droplet, the faster it will flash completely to vapour. The smaller the heavy hydrocarbon (asphaltene) particle the more surface area available for heat transfer to cool the heavy droplets down with the goal of producing a dry, non-sticky solid particle. Additional cold gas is added to the bottom of the spray dryer to enhance cooling by additional convective heat transfer as well as increasing the droplet residence time by slowing its descent rate (via upward cooling gas flow) in order to reduce the size of the vessel (which tend to be extremely large). This arrangement is not required if the asphaltene particles that have settled out in the extractor are in a solid form in the solvent at the process operating temperature.

In U.S. Pat. No. 4,278,529, a process for separating a solvent from a bituminous material by pressure reduction without carry-over of bituminous material is illustrated. The fluid-like phase comprising bituminous material and solvent is reduced in pressure by passage through a pressure reduction valve and introduced into a steam stripper. The pressure reduction vaporizes part of the solvent and also disperses a mist of fine bituminous particles in the solvent. The concern with this approach is that the remaining asphaltene remains wet and sticky and has not enough solvent left to keep the heavy bituminous phase (with many solids) flowable.

In U.S. Pat. No. 4,572,781 a solvent deasphalting process for separating substantially dry asphaltenes of high softening point from heavy hydrocarbon material using a centrifugal decanter to separate a liquid phase from a highly concentrated slurry of solid asphaltenes is described. This process attempts to handle a rich asphaltene stream that has solid particles but is a highly costly process since the separation of the solids is done through a solid/liquid separation with additional solvent needed to make the material flow to the decanter. Invariably, the separated solid material is still relatively wet and needs another drying step to recover the solvent as a vapour. The solvent vapour needs to be condensed for re-use, another high energy step.

In U.S. Pat. No. 5,009,772 a method is shown relating to a continuous, relatively low temperature deasphalting process in which a heavy hydrocarbon feedstock material and an extraction solvent are contacted, at elevated subcritical temperatures and superatmospheric pressures, in an extraction zone to produce a light extract phase and a heavy phase rich in higher molecular weight hydrocarbon components, Conradson carbon precursors and heavy metals. U.S. Pat. No. 5,009,772 comprises continuously effecting a reduction in the pressure upon the first light extract phase produced within the extraction zone suggesting there are benefits of operating at less than supercritical conditions in the SDA unit. However, further improvements in the overall process can be used to allow for more heavier crudes to processed in a simpler, less costly fashion.

In U.S. Pat. No. 7,597,794, a dispersion solvent is introduced into the asphalt phase after separation by solvent extraction and the asphalt phase undergoes rapid phase change in a gas-solid separator and is dispersed into solid particles while the solvent vaporizes, resulting in low temperature separation of asphalt and solvent with adjustable size of the asphalt particles. The challenge with flash/spray driers using liquid solvent as the transport media is the propensity for the asphaltenes generated in this process to remain wetted before, during and after the flash drying phase. In addition, with this process, the asphaltene continues to liquefy at elevated temperatures. A wetted asphaltene sticks to all surfaces and fouls and plugs the equipment readily. The reduced reliability from using this approach makes this operation costly for heavy crudes with high asphaltenic content. Example 6 in the patent uses heavy crude with an API of 2 with a resultant overall DAO yield of 83.5% and solvent recovery of over 80%. Both these values represent an uneconomic process and can be greatly improved.

In U.S. Pat. No. 7,749,378, a method is illustrated for transporting and upgrading heavy oil or bitumen, comprising: diluting the heavy oil or bitumen at a production site with a diluent comprising a hydrocarbon having from 3 to 8 carbon atoms to form a mixture; transporting the mixture from the production site to a solvent deasphalting unit; deasphalting the mixture in the solvent deasphalting unit to recover an asphaltene fraction, a deasphalted oil fraction essentially free of asphaltenes, and a solvent fraction; separating water and salts from the asphaltene fraction, the deasphalted oil fraction, and the solvent fraction at the solvent deasphalting unit; and conveying at least a portion of the solvent fraction to the production site to dilute the heavy oil or bitumen and form the mixture. The process is rightfully limited to crudes above 2 API (2-15 API is claimed) in this patent since plugging of the extractor invariably results in low reliability and the conditions allowed in the process limit overall yield to <85% of the total barrel since heavy crudes like bitumen will have asphaltene content over 15% and these molecules are entirely rejected in this process.

In U.S. Pat. No. 7,964,090 a method for upgrading heavy asphaltenic crudes using SDA and gasification is disclosed. Of interest in this patent, a stream to a gasifier is generated by mixing a hydrocarbon comprising one or more asphaltenes and one or more non-asphaltenes with a solvent, wherein a ratio of the solvent to the hydrocarbon is about 2:1 to about 10:1. The asphaltene rich stream is transferred out of the SDA to a gasifier as a liquid stream. The large quantities of solvent used in transport are consumed in the gasifier, and are downgraded in value to a fuel gas equivalent. Since the asphaltenes tend to be liquid, using a solvent to transport the material in the quantities stated is feasible. For a solid asphaltene, this method would require 10-20 times more solvent to transport and this quantity of expensive solvent would be consumed and its value reduced.

SUMMARY OF THE INVENTION

Essentially, an improved process for producing a pipeline-ready crude and refinery feedstock from heavy crude oils, such as Canadian Oil Sands bitumen, is described, with said process consisting of: (1) optimal asphaltene conversion with minimum coke and offgas make in a full bitumen stream within a reactor to produce a thermally affected asphaltene-rich fraction, a minimum non-condensable vapour stream, and an increased refinery-feed liquid stream; (2) deasphalting said thermally affected asphaltene-rich fraction into a refinery-feed liquid stream and a concentrated asphaltene stream; (3) Selectively hydrotreating specific hydrocarbon components as required for pipeline specification, and finally blending of all the liquid streams to produce a refinery feed; and (4) inertial separation of the concentrated solid asphaltene stream for conversion in a gasifier, power or asphalt plant.

The bitumen is thermally treated to remove and convert/crack selected asphaltenes, which are then sufficiently separated in a more efficient solvent extraction process, reducing production of coke and isolating undesirable contaminants (like metals, MCR, and remaining asphaltenes).

Considering the relative complexity and high degree of side chains on Canadian bitumen asphaltenes, under the operating conditions of the invention disclosed here, the side chains are preferentially cleaved from the core asphaltene molecule to make desired vacuum gas oil to light hydrocarbon range components. Light hydrocarbon includes for example methane, ethane, and propane. The remaining thermally affected polyaromatic asphaltene cores remain solid at elevated temperatures and pressures above operating conditions and thus separate more readily than non-thermally affected asphaltenes resulting in improved separation processes, such as solvent deasphalting (50) and inertial separation (60).

Further, the heavier hydrocarbons in the bitumen are also mildly cracked to vacuum gas oil, gasoline and distillate boiling range components, all desirable for separation and conversion in refineries. Any major deviations in temperature and heat flux within the bitumen pool in the reactor will lead to coking and increased gas yield and a reduction in the overall crude yield of the original bitumen, and reduced reliability of the operation, increasing the operating cost of the facility.

The invention provides an improved apparatus and method for producing a pipeline-ready and refinery-ready feedstock from heavy, high asphaltene crudes (for example, Canadian bitumen) and feedstocks, with utility for any virgin or previously processed hydrocarbon stream, the process and apparatus comprising a pre-heater for pre-heating a process fluid to a design temperature at or near the desirable operating temperature of a reactor; moving the process fluid into a reactor for conversion of the process fluid by controlled application of heat to the process fluid in the reactor so that the process fluid maintains a substantially homogenous temperature throughout the reactor to produce a stream of thermally affected asphaltene-rich fractions, and a stream of liquid hydrocarbon vapour with minimal non-condensable vapour. The stream of vapour is separated into two further streams: of non-condensable vapour, and of light liquid hydrocarbons. The thermally affected asphaltene-rich fraction is first mixed using a high-shear mixer, then is deasphalted using a single-stage solvent extraction process into streams of deasphalted oil liquid and concentrated asphaltene, respectively. The deasphalted oil liquid and the light liquid hydrocarbons produced in the processes are blended to form a pipeline and refinery-ready feedstock. The concentrated asphaltene is processed in an inertial separation unit to create a dry solid asphaltene by-product.

A sweep gas can be deployed in the reactor, and can be preheated to provide a heat flux source other than the reactor's heaters; the sweep gas may also assist in the removal of reactor vapour products.

Deasphalting is achieved using a minimum of one extraction step (more steps may be used) and a low pressure stripper at conditions outside any open-art solvent extraction process. Since the initial process fluid has been thermal-affected, the heavy asphaltene-rich fractions can be further separated using a high shear mixer and a lower complexity single stage extraction process using a combination of lower solvent-to-oil ratios, temperatures and pressures than typically found in similar upgrader operations. Even further improved solvent-extraction performance, using even lower overall solvent to oil ratios and improved DAO yield can be achieved by further concentrating the asphaltene rich fraction before a final extraction step. The process improves on open-art solvent deasphalting utilizing an additional solvent extraction column (rinse column) operating on the asphaltene-rich stream from the primary solvent extraction column to increase pipeline crude recovery and quality.

The SDA process may allow for some portion of the heavy asphaltene-rich hydrocarbon stream to be recycled and blended with the fresh feed to the reactor.

The resulting concentrated thermally-affected asphaltenes can be successfully processed in an inertial separator such as a centrifugal collector or settling chamber to generate a dry, solid asphaltene by-product.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

Figure 1:
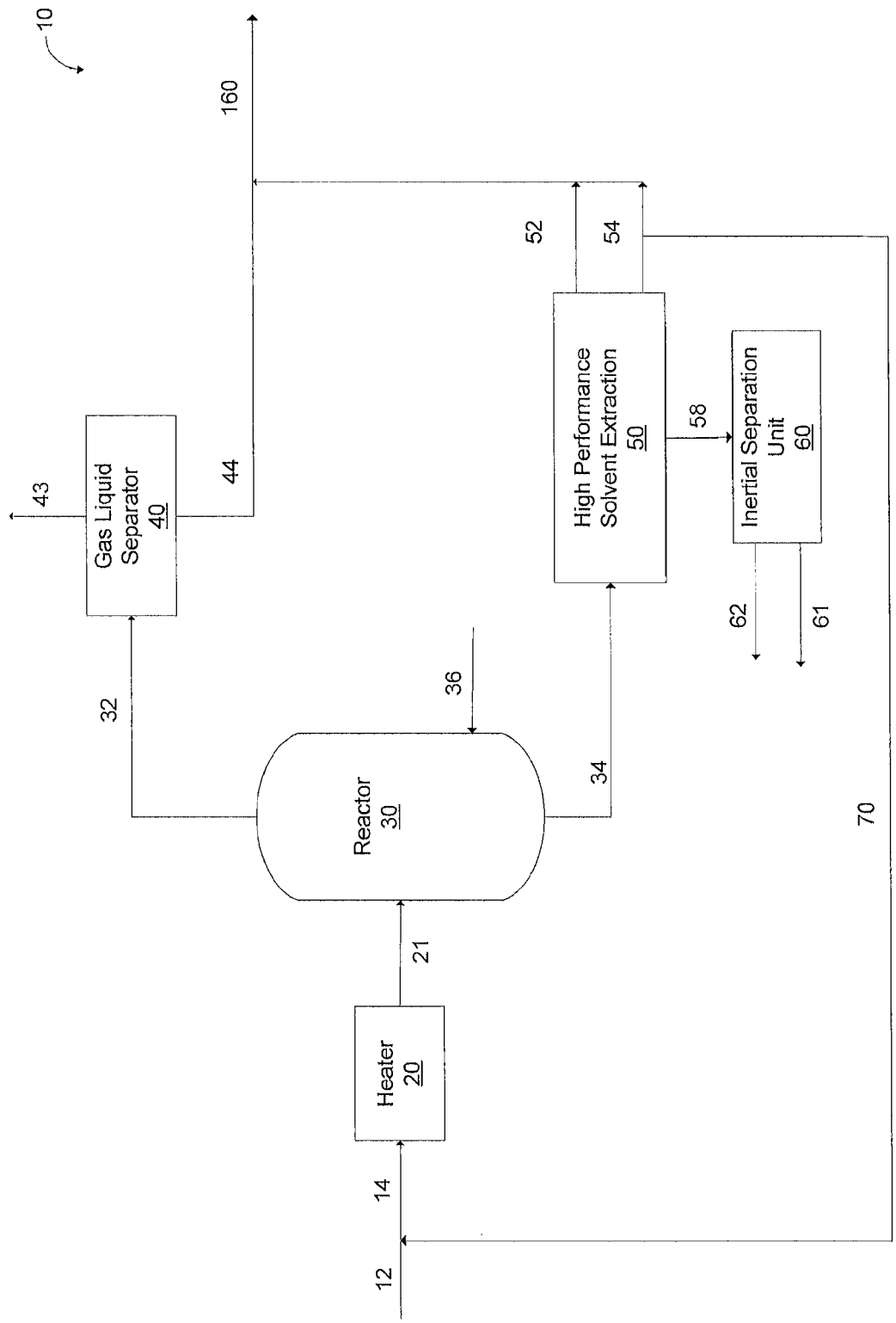
FIG. 1 is a process diagram for forming a pipeline transportable hydrocarbon product from a heavy hydrocarbon feedstock.

FIG. 1 is a process flow diagram depicting a process 10 for forming a hydrocarbon product 160 from a hydrocarbon feedstock 12, where the final hydrocarbon product 160 has sufficient characteristics to meet minimum pipeline transportation requirements (minimum API gravity of 19) and is a favourable refinery feedstock. A process fluid 14 formed from a feedstock 12 of heavy hydrocarbon can be routed through a heater 20 to heat the process fluid 14 to a desired temperature level before the resulting stream 21 is routed to a reactor 30 where the process fluid 14 is controlled and maintained while it undergoes a mild controlled cracking process. After the mild cracking process, a light top fraction 32 can be routed from the reactor 30 to a gas liquid condensing separator process 40 and a heavy bottom fraction 34 can be routed to a high performance solvent extraction process 50. Some of the outputs 44 from the gas liquid separation process 40 can be blended with some of the outputs 52, 54 of the high performance solvent extraction process 50 to result in a hydrocarbon product 160 that has sufficient physical characteristics to enable it to meet the required pipeline transport criteria without having to mix the final hydrocarbon product 160 with diluents from external sources, or requiring much reduced volumes of such diluent.

The feedstock 12 can be a heavy hydrocarbon (virgin or a previously processed stream), such as the heavy hydrocarbon obtained from a SAGD (steam assisted gravity drainage) process, for example Canadian Oil sands bitumen, or from any other suitable source of heavy hydrocarbon. In one aspect, the feedstock 12 can have an API gravity in the range of 0 to 14.

In one aspect, a recycled portion 70 of the resin stream 54 output from the high performance solvent extraction process 50 can be blended with the incoming feedstock 12 to form the process fluid 14 that passes through process 10. The resin stream may be added to the process fluid in instances in which further crude yield, and/or lighter crude, and/or asphaltene suppression is desired in order to meet treated product characteristic targets. The resin recycle provides the operator with flexibility, through an adjustable flow parameter, to meet production specifications, and allows the plant to handle feedstock variations robustly.

The resin product 54 from the solvent extraction process 50 will typically have a relatively low API gravity. In one aspect, the API gravity of the resin product 54 can have an API gravity between 0 and 10. Depending on the characteristics of the feedstock 12 and the amount of resin product 54 blended with the feedstock 12, the resulting process fluid 14 can have a range of characteristics and particularly a range of API gravities.

The process fluid 14 (obtained entirely from the feedstock 12 or formed as a blend of feedstock 12 and resin product 54 from the solvent extraction process 50) can be routed to the heater 20 where the process fluid 14 can be heated to a desired temperature as it passes through the heater 20 before being routed to the reactor 30 to undergo mild thermal cracking. Reactor 30 maintains a consistent fluid temperature through a uniform application of heat through-out the reactor to allow for mild thermal cracking to occur without coking being a concern or detrimental to the operation and/or performance of the reactor.

In one aspect, the heater 20 will heat the process fluid 14 to a temperature between 675-775° F. before the process fluid 14 is introduced into the reactor 30.

In the reactor 30, the process fluid 14 (heated to between 675-775° F. by the heater 20) undergoes a mild controlled cracking process. Appropriately located heaters are provided in this reactor 30 to maintain the desired constant temperature generated in heater 20 and to apply uniform heat flux for the fluid 14. The heaters provide heat through any source readily available (electric, heat transfer fluid, radiant etc.). The reactor 30 can be operated in a manner, through optimizing primarily five inter-related process variables (Temperature, Pressure, Residence Time, Sweep Gas and Heat Flux), so as to reduce or even prevent coke from forming during the reaction, and minimizing gas production, while also providing optimal conversion of the part of the asphaltene portion of the heavy hydrocarbon to refinery-ready feedstock components.

The first and second variables involve applying a uniform heat flux between 7000-12000 BTU/hr sq.ft to the entire pool of process fluid in the reactor and maintaining a single operating temperature in the reactor between 675-775° F. This may be achieved by the presence of appropriately sized and located heating devices in the reactor. The number of heaters will be set by calculating the optimal dispersion of heat between any two heaters so as to have a uniform temperature throughout the pool and to avoid peak or spot temperatures significantly higher than the target temperature in the reactor.

The third reactor variable, residence time, can be between 40-180 minutes in the reactor.

The fourth reactor variable, operating pressure, can be maintained at near atmospheric pressure, in any case to be less than 50 psig, with standard pressure control principles used for consistent performance. The pressure range is controlled on the low end to prevent excessive, premature flashing of hydrocarbon, essentially bypassing the reactor, and limited on the high end to reduce secondary cracking and consequent increased gas yields.

The fifth reactor variable, hot sweep gas 36, in the same temperature range as the process fluid (675-775° F.) 21, is added to the process fluid 14 in the reactor 30 in the range of 20-80 scf/bbl.

The sweep gas 36 can be natural gas, hydrogen, produced/fuel gas from the process, steam, nitrogen or any other non-reactive, non-condensable gas that will not condense to a liquid in the reactor environment.

Sweep gas in the dosage of 20-80 scf/bbl of feed is provided to remove the "lighter" hydrocarbon products (i.e. methane to <750° F. boiling point hydrocarbons) as soon as they are formed in the reactor 30 so that there is a minimum of secondary cracking which could increase gas make and potentially increase olefinic naphtha/distillate production.

The sweep gas may also allow the reactor to operate closer to the desired operating pressure (<50 psig) and temperature. The sweep gas 36 can also be used to provide additional heat and/or mixing to the process fluid 14 in the reactor 30.

Figure 2:
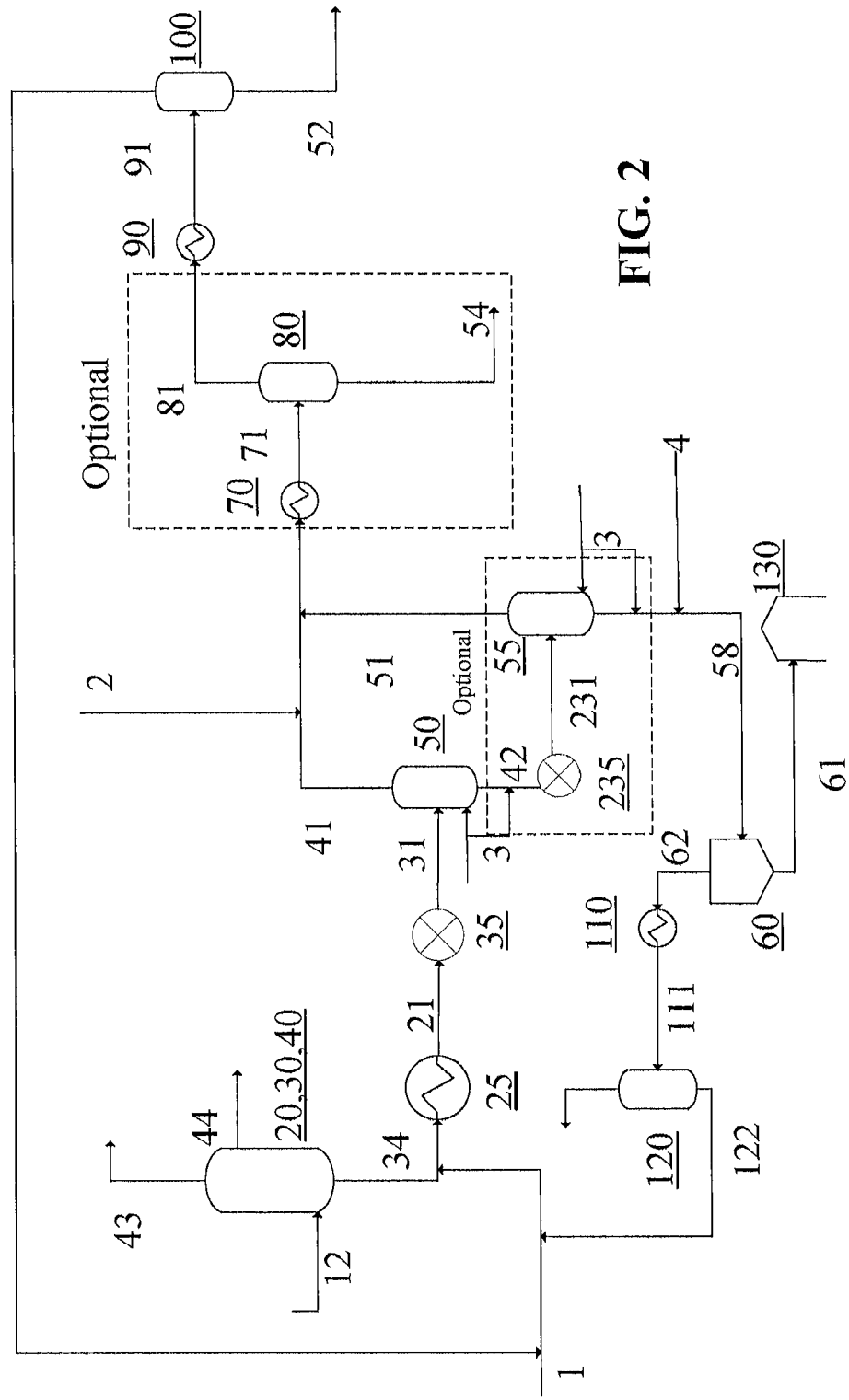
FIG. 2 is a process diagram pertaining specifically to a cracking process and liquid separation process and a solids separation process.

As discussed with respect to FIGS. 1 and 2, the heat energy stream 36, for reactor 30 is uniformly (7000-12000 BTU/hrsq.ft) applied throughout the hydrocarbon residence time (40-180 minutes) in the reactor at the desired temperature (675-775° F.) and pressure (less than 50 psig) to minimize any local peak fluid temperatures which can initiate coking, and thereby allowing an increased thermal transfer of heat at a higher bulk temperature improving the conversion of hydrocarbons within reactor 30. At these operating conditions, the reaction kinetics favour optimum conversion of the asphaltenes that preferentially cleaves the outlying hydrocarbon chains creating desirable hydrocarbons (VGO and diesel range hydrocarbons) for the refiner without causing coking or increased gas production in the reactor. As an example, Table 1 illustrates different configurations of asphaltenes for different types of crudes. The proposed operating conditions of reactor 30 factor in the relative complexity and high degree of side chains on different crudes.

TABLE 1
Average molecular structures representing asphaltene molecules from different sources: A, asphaltenes from traditional heavy crudes; B, asphaltenes from Canadian bitumen (Sheremata et al., 2004).
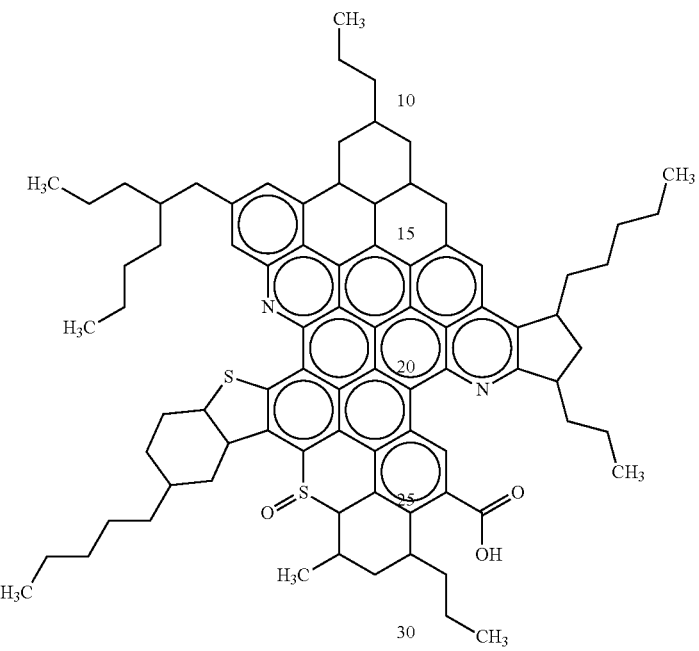
A
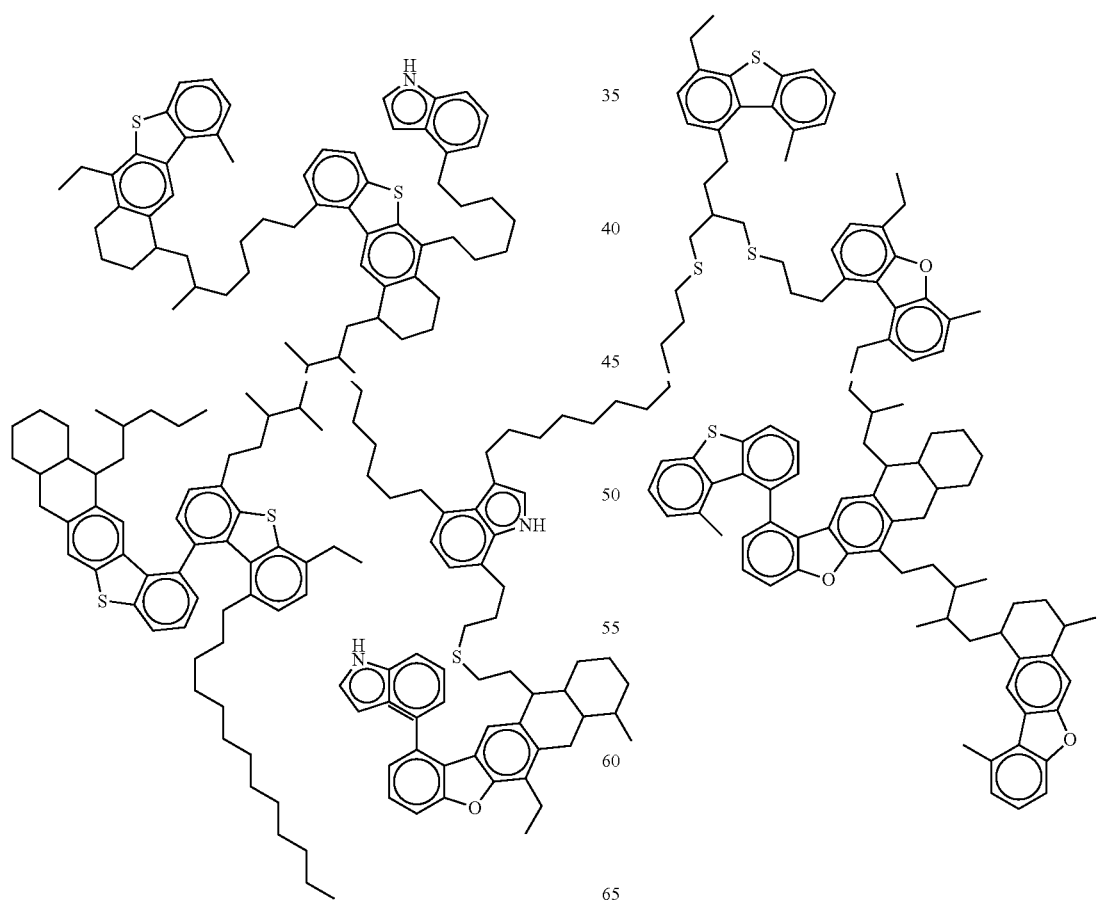
B Each variable may be changed independently, within the ranges suggested, based on the quality of feedstock provided or based on the quality of output desired. Since the 5 noted process variables are inter-related, a multi-variable process control scheme with a prescribed objective function (for example maximum yield to meet minimum product specifications) will be beneficial to ensure the process operates at an optimal point when any one of the variables is changed or the feed/product situation or goal is altered.

Once the process fluid 14 has remained in the reactor 30 for a sufficient amount of time so that the characteristics of the outputs of the reactor 30 reach desired qualities, a light overhead fraction 32 and a heavy bottoms fraction 34 can be removed from the reactor 30.

The light overhead fraction 32 of the output from the reactor 30 can contain non-condensable vapor products, light liquid hydrocarbon and heavier liquid hydrocarbon. The vapor products can be vapors released from the process fluid 14, such as sour gas, while undergoing thermal cracking, as well as introduced and unconverted or unused sweep gas 36 that has passed through the reactor 30.

The overhead liquid fraction 32 will have a much higher API gravity than the bottom fraction 34. For example, the overhead liquid fraction 32 could typically have an API gravity of 26 or greater. The overhead fraction 32 can be directed to a gas liquid separation unit 40, which can comprise a cooler and separation drum, as an example, in which a portion of the overhead fraction 32 that is a condensable liquid product containing naphtha and heavier hydrocarbons can be separated from the gaseous components of the overhead fraction 32. An off-gas line 43 containing undesirable gases such as sour gas, can be provided at the separation drum for those gases to be disposed of recycled, or subjected to further treatment.

One or more liquid hydrocarbon streams can be produced from separation drum. Stream 44, a heavier hydrocarbon than stream 43, can be sent to product blending, while stream 43 can be considered for further bulk hydro-treating prior to product blending.

The bottom fraction 34 can contain hydrocarbons, and modified asphaltenes. Although the characteristics of the bottom fraction 34 taken from the reactor 30 will vary depending on the process fluid 14 input into the reactor 30 and the reactor's operating parameters, in one aspect the bottom fraction 34 can have an API gravity ranging between −7 and 5.

Controllable process variables allow an operator to vary the performance of the reactor 30 to meet the needs of the final product based on changing characteristics of the incoming process fluid 14.

The controllability of the five inter-related variables, residence time, sweep gas, heat flux, temperature and pressure in the reactor 30 allow an operator to vary the performance of the reactor 30.

In this manner, when the characteristics of the feedstock 12 are changed either as different fresh feed or more or less resin recycle 70, the five inter-related process variables can be optimized to avoid the production of coke and minimize the production of non-condensable vapors are produced in the reactor 30. For example, the operator can vary the residence time of the process fluid 14 in the reactor 30 based on the characteristics of the process fluid 14 to obtain the desired yields and/or quality of the outputs 32, 34. Alternatively, the operator can vary the sweep gas, temperature or pressure to achieve similarly tailored outcomes. The process variables are inter-related and the minimization of coke and avoidance of excess gas make is challenging and is best determined by pilot operations, which may be done without undue experimentation.

The bottom fraction 34 from the reactor 30 can be fed to a high performance solvent extraction process 50 that can produce a thermally affected asphaltene stream 58, an extracted oil stream 52 and a resin stream 54. The reactor 30 is operated in a manner that significantly limits and even prevents the formation of coke and reduces gas production while converting asphaltenes into more suitable components for downstream processing. Consequently, modified asphaltenes and other undesirable elements remain in the bottom fraction 34 that is removed from the reactor 30.

To maximize the recovery of the desirable refinery feedstock crude the undesirable elements that remain in the bottom fraction 34, the bottom fraction 34 from the reactor 30 must be further treated using, for example, a high performance solvent extraction process 50. The treatment of the bottom fraction 34 by solvent extraction process 50 allows the reactor 30 and the solvent extraction process 50 to be used in conjunction to produce a suitable full range refinery feedstock crude.

The solvent extraction process 50 can comprise any suitable solvent extraction process. In one aspect, it can be a three stage super-critical solvent process that separates the asphaltenes from the resins in the bottom fraction 34. The output of the solvent extraction process 50 can be an asphaltene stream 58, an extracted oil stream 52 and a resin stream 54. The asphaltene stream 58 is typically undesirable and is removed from the process 10. The extracted oil stream 52 can be of a relatively high quality, with an API gravity range of 9 to 15. The resin stream 54 is typically of a lower quality than the extracted oil stream 52, with an API gravity lower than the extracted oil stream 52. In one aspect, the resin stream 54 can have an API gravity in the range of 0 to 10 API gravity.

The extracted oil stream 52 and the resin stream 54 from the solvent extraction process 50 can be blended along with the liquid product stream 44 obtained from the liquid gas separator 40 to form a final hydrocarbon product 160 meeting the specifications of the pipeline and/or refinery-ready. In one aspect, this final hydrocarbon product 160 would have an API gravity greater than 19. Typically, the final hydrocarbon product 160 would have a viscosity of 350 CentiStokes ("cSt") or less.

The resin stream 54 is typically of a lesser quality than the extracted oil stream 52. The recycle portion 70 of the resin stream 54 can be blended with the feedstock 12 to be reprocessed in order to form the final hydrocarbon product 160. As a result, this recycling portion of the resin stream will improve the quality of the final hydrocarbon product 160.

In one embodiment, the asphaltene stream 58 is fed to an inertial separation unit 60 to produce a solvent vapour stream 62 and a dry solid asphaltene stream 61. The inertial separation unit 60 will be described in more detail hereinbelow.

In another aspect, in FIG. 2, the optimal solvent deasphalting and solid separation scheme is illustrated when integrated with reactor 30 operated with the five inter-related variables set accordingly for maximum yield. The feedstock 12 is fed to an integrated mild thermal cracker 20,30,40 which generates at least stream 44, a heavier hydrocarbon than stream 43 and bottom fraction 34 as described above with respect to FIG. 1. Solvent 1 may be added to bottom fraction 34 before it is sent to an SDA pre-heat unit 25 to generate stream 21. Stream 21 is sent to a shear mixer and/or rapid/complete mixer 35 to produce stream 31, which is then fed to a single asphaltene extractor 50. A solvent 3 may be added to the extractor 50 while stream 31 is processed therein. The shear mixer 35 and the single asphaltene extractor 50 are provided to separate the solid asphaltenes in stream 58 from the oil and solvent, stream 51. Because of the thermally affected asphaltenes created in reactor 30, the solvent extraction can occur in one stage and can be effective at a solvent to oil mass ratio of up to about 2.5:1 and at operating conditions well below the critical point for the solvent. As a result of the low energy/intensity single stage extraction, a single low pressure solvent stripper processing stream 41 is economical and effective to separate the product deasphalted oil 52 and the recovered solvent as stream 101. Stream 41 may be separated into stream 101 and oil 52 by adding solvent 2 and/or 51 and heating 90 the resulting stream to generate a stream 91 for processing in a solvent stripper unit 100. In one embodiment, prior to heating 90, stream 41 may be optionally heated 70 to produce stream 71 for processing in a resin extractor and stripper 80. The resin extractor and stripper 80 outputs a stream 81 for subsequent heating 90 and processing by solvent stripper 100, and the resin stream 54 as described above with respect to FIG. 1. Stream 42, the concentrated asphaltene solid stream produced by asphalt extractor 50, is processed in an inertial separator 60 separating a solvent vapour stream 62 and a dry solid asphaltene stream 61. Stream 62 is condensed using a solvent condenser 110 to produce stream 111, which is fed to a solvent recovery unit 120. The recovered solvent 122 is mixed with stream 1 for reuse in the process. The dry solid is sent to dry solid storage 130 or otherwise handled. The inertial separation unit 60 separates the asphaltene solids from the gas remaining solvent in stream 42 using a combination of forces such as centrifugal, gravitational, and inertial. These forces may move the asphaltene solid to an area where the forces exerted by the gas stream are minimal. The separated solid asphaltene may be moved by gravity into a hopper where it is temporarily stored. Unit 60 can be either a settling chamber, baffle chamber or centrifugal collector; a device that provides inertial separation of solid and gas. Centrifugal collectors can either be single or multi-staged cyclones. In the event the SDA unit 50 is overly effective in separating the asphaltenes from the resin, DAO and solvent, stream 42 can be injected with suitable low molecular weight gas (ex. Natural gas, or nitrogen) to provide pneumatic conveyance to the asphaltene solids that otherwise would be provided by flashing remaining process solvent in the line. A pneumatic conveying system may transport solids up to approximately 50 mm particle size. The solid must be dry, with no more than 20% moisture and not sticky. The thermally-affected asphaltene solids meet the above criteria and thus the process benefits from the ability to use an inertial separation unit, 60.

To increase overall recovery of product hydrocarbon from reactor 30 and reduce solvent circulation rates, a high-performance solvent extraction process may optionally include a supplemental extraction process 55, with a second shear mixer and/or rapid/complete mixer 235. For example, stream 42 from extractor 50 is fed to shear mixer 235 to generate a stream 231 for processing in the second extractor 55. Solvent 3 may be added to stream 42 prior to entering shear mixer 235 and may also be added to extractor 55 while processing stream 231. Extractor 55 outputs asphaltene stream 58 which may be processed by the inertial separator 60 in a similar manner as stream 42 as described above. Solvent 3 and transport gas 4 may be added to stream 58 prior to the inertial separation process 60. The additional solvent extraction step on the asphaltene-rich stream by the second extractor 55 uses standard liquid-liquid extraction with the same solvent used in the primary extractor. The placement of this standard liquid-liquid column on the asphaltene-rich stream may be beneficial since the solvent to oil ratio can be economically increased within this column up to 20:1 to increase the recovery of deasphalted oil, while the overall solvent use is reduced. Overall solvent use to achieve high hydrocarbon recovery in stream 52 can be 25% less than using comparable open art processes. The result is a significant reduction in energy consumption compared to a state of the art 3-stage extraction process. The resulting asphaltene stream 58 can be processed in a 20% smaller asphaltene separation unit 60. The core portion of the remaining concentrated thermally-affected asphaltenes are solid even at elevated temperatures (above 700° F.) with the side hydrocarbon chains removed, resulting in less volume for the asphaltene separation unit to handle. In addition, the modified nature of the asphaltenes provides for the opportunity for more effective metals reclamation and better feedstock for a clean energy conversion technology (eg. gasification, catalytic gasification, oxy-combustion for enhanced SAGD production).

Process 10 in FIG. 1 provides a crude feedstock that is pipeline compliant and is optimal for high conversion refiners. Stream 160 has low metals (<20 wppm Ni+V), low asphaltenes (<0.3 wt %), a very low TAN number (<0.3 mg KOH/mg), no diluent, and is high in VGO range material (30-50% of crude). For high conversion refiners (>1.4:1 conversion to coking), the distillation quality of the crude produced in stream 160 will improve utilization of the highest profit-generating units while filling out the remaining units. Table 2 shows the percentage of each boiling range material that comprises a barrel of oil for various representative heavy oil crude streams in comparison to stream 160 of process 10. The "non-upgraded" feedstocks (dilbit=diluted bitumen, and WCS=Western Canada Select) have more vacuum heavy residue (950+° F. material), over 35% of the total barrel, requiring intense conversion and more light material to transport (C5's) to the refinery than refiners can profitably refine to transportation fuels. The full upgraded/produced refinery-ready feedstock (SSB=sweet synthetic blend) on the other hand has essentially no vacuum residue or light material (C5's). It is not balanced and thus has volume limitations with refiners. Refiners have developed operations that process an overall well-balanced feedstock comprising of 10-25% vacuum residue, 20-50% gas oils (HVGO=heavy vacuum gas oil, LVGO=light vacuum gas oil, AGO=atmospheric gas oil), a 40-60% gasoline to diesel range material. As shown in table 2, Stream 160 compares favourably to other heavy conventional well-balanced crudes (ANS=Alaska North Slope, WTI=West Texas Intermediate, MSO=Medium Sour (Midale)) with hydrocarbon composition in the same range as these other heavy conventional crudes.

TABLE 2

Distillation analysis for various crudes including Process 10 Product

| % of barrel | Stream 160 (Process 10) | Dilbit | ANS | WTI | MSO | WCS | SSB |
|---|---|---|---|---|---|---|---|
| C5s | 0.0 | 6.0 | 4.0 | 4.0 | 4.0 | 6.9 | 1.5 |
| Naphtha/Gasoline | 8.7 | 16.0 | 26.6 | 31.0 | 18.5 | 12.3 | 20.1 |
| Kerosene | 15.5 | 5.0 | 13.4 | 20.0 | 18.3 | 10.9 | 23.7 |
| Diesel | 15.1 | 5.0 | 11.3 | 10.6 | 18.8 | 7.5 | 15.5 |
| AGO/Fuel Oil | 16.1 | 6.0 | 9.1 | 7.3 | 6.2 | 8.9 | 12.0 |
| LVGO | 15.1 | 7.5 | 7.7 | 7.3 | 6.6 | 6.9 | 17.8 |
| HVGO/Bunker C | 12.7 | 8.5 | 8.3 | 7.3 | 7.0 | 10.1 | 9.0 |
| Vacuum Residue | 16.9 | 46.0 | 19.7 | 12.5 | 20.6 | 36.5 | 0.5 |

The combination of reactor 30, high performance solvent extraction process unit 50, and inertial separation unit 60, exhibits a reduced process complexity. This may be expressed as a Nelson complexity index value of 4.0-4.5, significantly less than 9.0-10.0 for a coking and/or hydroprocessing scheme. Another illustration of improved performance is the reduced energy requirement of 3.93 GJ/tonne feed when compared to a delayed coking process that requires an energy input of 4.70 GJ/tonne feed to operate. This is a 16.4% reduction in energy intensity compared to a delayed coking process. This corresponds to a specific greenhouse gas (GHG) output of 0.253 tonne CO2/tonne feed for the Delayed Coking process and 0.213 tonne CO2/tonne feed for the proposed process. On a product comparison basis, the energy reduction is approximately 25-27% versus a coking process.

When compared to a coking upgrading process and standard reactor and solvent extraction process, process 10 provides a significant improvement in yield by minimizing by-products (Coke and non-condensable hydrocarbons) as noted in Table 3.

TABLE 3

Product (stream 60) yield comparison

|  | Volume % | Mass % |
|---|---|---|
| Coking | 80-84 | 78-80 |
| Standard reactor/solvent extraction process | 86 | 80-82 |
| Process 10 | 89-91 | 84-86 |

With the lower complexity of process 10, another benefit, attributed to lower operating temperatures and pressures, is the lower capital cost. Less equipment is needed, and the flange rating that can be used is right below the "break-point" where materials specifications change due to pressures and temperatures involved, increasing costs. Considering the high sulfur content and TAN rating of the material, 304L/316LSS material is a suitable choice for reliability. For this metallurgy, class 300 piping and flanges, as an example, can handle up to 400° F. and 415 psig (source: ASME/ANSI B16.5 1988/2009 specification). The SDA unit will operate at maximum 400° F. and 400 psig, so Class 300 can be specified. When comparing to open-art SDA processes, a higher piping/flange class like class 600 will be required to deal with the higher operating temperatures and pressures of those other processes. The overall capital cost savings will be in the 20-30% range for process 10 versus open-art SDA configured processes, with Class 600 flanges, for example, costing 8 times the price of Class 300 flanges.

Figure 3:
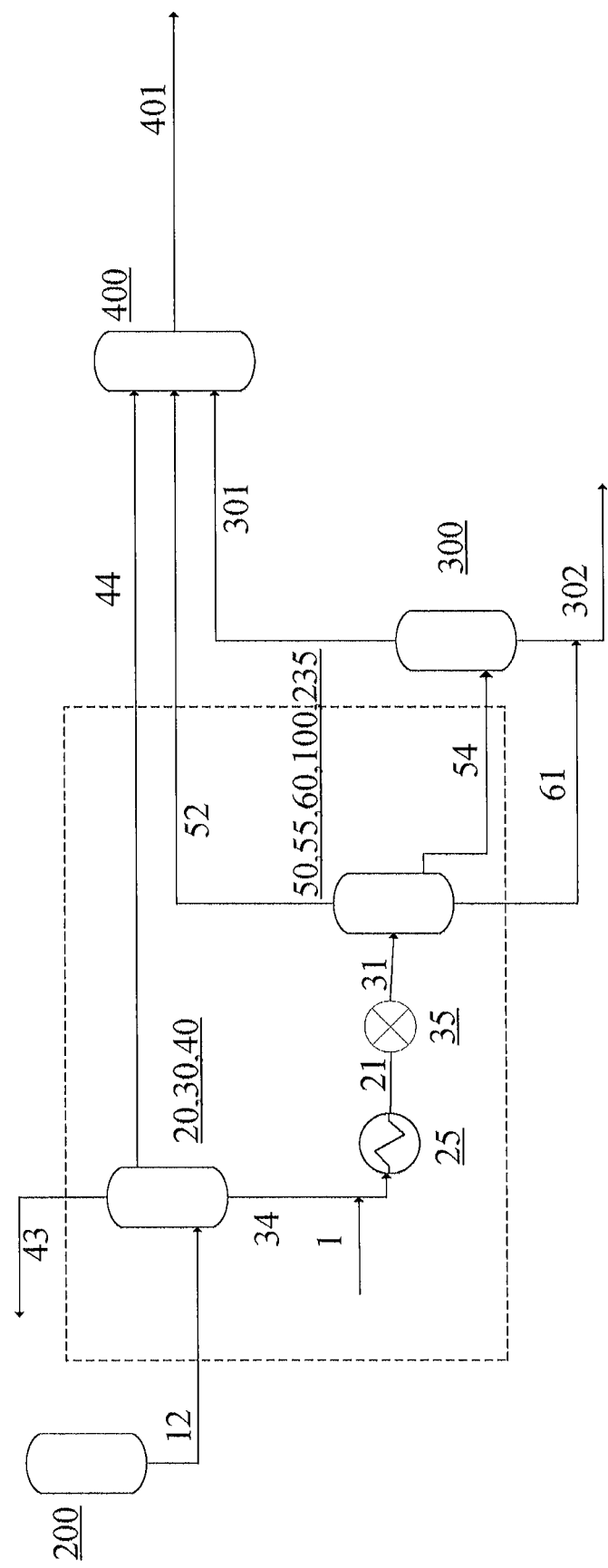
FIG. 3 depicts an illustrative application of an integrated mild thermal cracking and improved solvent deasphalting process with appropriately placed shear mixing devices within an existing upgrader or refinery with a vacuum and/or coking unit according to one or more embodiments described.

As well as being suitable for new grassroots facilities, FIG. 3 shows an illustrative application of the disclosed integrated controlled thermal cracker and improved SDA of this invention to an existing upgrader. The proposed integrated process, reactor 30, simplified SDA 50, and asphaltene recovery 60, can be placed upstream of a refiner's/upgrader's coking unit. The benefit to a refiner/upgrader is the ability to debottleneck the vacuum and coking unit and accept more heavy crude to the unit. More barrels processed on existing equipment equates to larger profits and economic returns on invested capital. In addition, with a higher quality material being sent to the coking unit, 300, the operating severity can be decreased, increasing the life of the coker by increasing the cycle time for the coker (from 12 to 24 hours), and producing less gas and coke and more product. Capital costs to replace equipment can be delayed and an increased yield can be realized (approx. 2-3%). The solid asphaltenes captured in the SDA have a readily available disposition, stream 302, the existing coke gathering and transport systems making the addition of the proposed integrated process more cost effective and highly profitable.

Stream 12 can be the bottoms streams from an atmospheric column, vacuum column, or a catalytic cracking unit, noted as unit 200 in FIG. 3. In FIG. 3, stream 12 is fed into integrated cracker 20, 30, 40 to produce at least stream 44, a heavier hydrocarbon than stream 43, and bottom fraction 34, all as described above with respect to FIG. 1. Stream 34 may have solvent 1 added thereto prior to SDA pre-heating 25 to generate stream 21. Stream 21 is sent to shear mixer 35 and the resulting stream 31 undergoes SDA process 50,55,60,100, 235. The integrated cracker 20,30,40 and SDA process 50,55, 60,100,235 produce a DAO stream 52 that can be further processed into transportation fuels of stream 401 in a hydrocracking and hydrotreating complex unit 400. The integrated cracker and SDA process also can produce a resin quality stream 54 that can be sent to a coking, FCC (fluidized catalytic cracking) and/or an asphalt plant 300 for further processing into finished products. Unit 300 produces a hydrocarbon stream 301, which can be sent to unit 400 for further processing, and a coke stream 302. As stated previously, the solid asphaltenes generated as stream 61 can either be mixed with the coke 302 generated in unit 300 or sent off-site for further processing (energy generation and/or sequestration).

Figure 4:
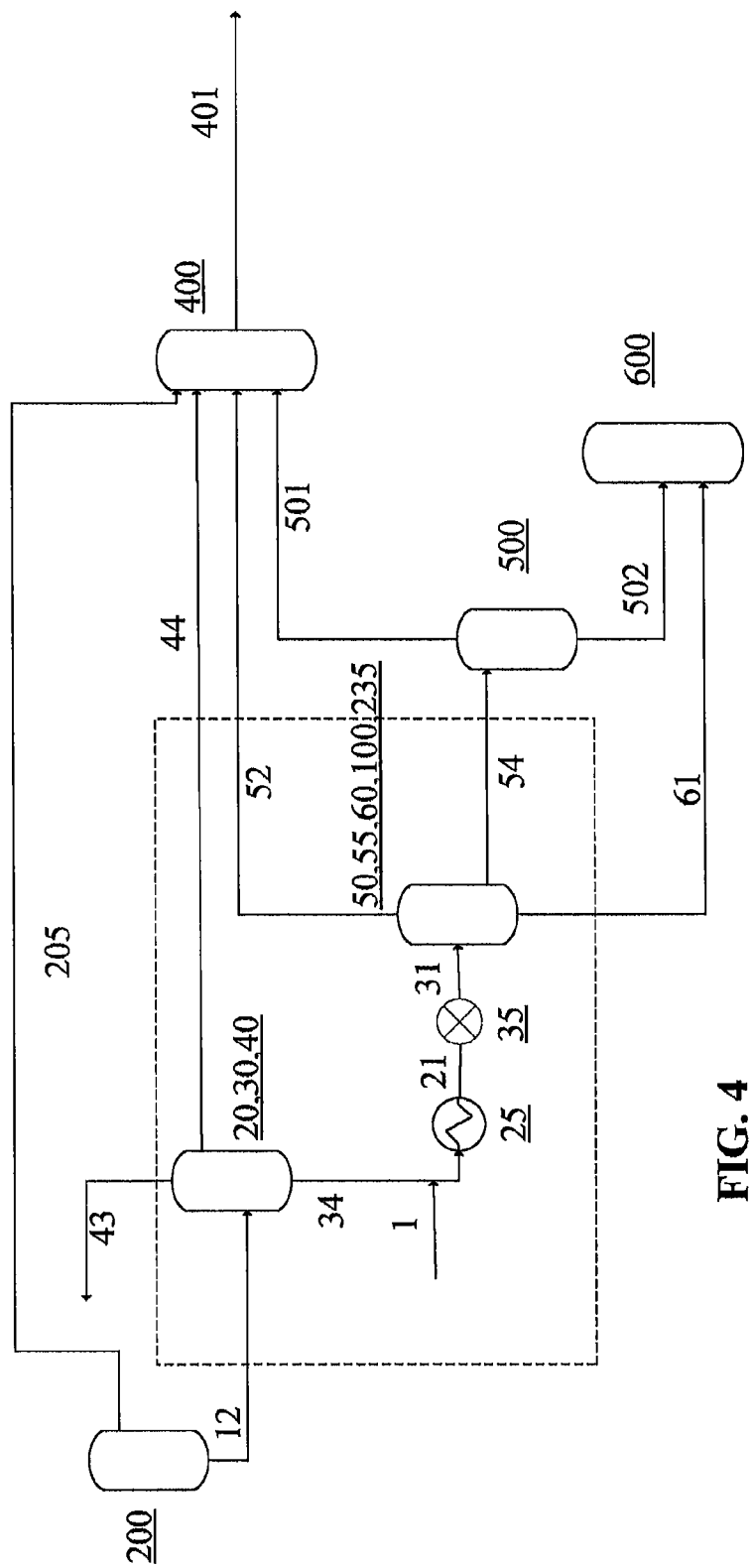
FIG. 4 depicts a specific illustrative application from FIG. 3 of an integrated mild thermal cracking and improved solvent deasphalting process fed a vacuum bottoms stream from an existing upgrader or refinery with the various products from the integrated cracker/SDA sent to hydrocracking, residual hydrocracking and gasification units according to one or more embodiments described.

As an example, FIG. 4 shows a specific embodiment for a new design or revamp opportunity for a refinery and/or upgrader. Unit 200 is a vacuum unit and the bottoms stream 12 is sent to the integrated cracker/SDA process, units 20,30, 40,50,55,60,100,235. Integrated cracker 20, 30, 40 produces at least stream 44, a heavier hydrocarbon than stream 43, and bottom fraction 34, all as described above with respect to FIG. 1. Stream 34 may have solvent 1 added thereto prior to SDA pre-heating 25 to generate stream 21. Stream 21 is sent to shear mixer 35 and the resulting stream 31 undergoes SDA process 50,55,60,100,235. The DAO stream 52 generated by the SDA process is sent to the hydrocracking and hydrotreating unit 400, along with stream 205 from the vacuum unit 200 and stream 44 from unit 40, to produce transportation fuels stream 401. A resin stream 54 is produced from unit 50, and sent to a residue hydrocracking unit 500, which produces a hydrocarbon stream 501 and an asphaltene stream 502. With less asphaltenes, that are highly exothermic when reacted, sent to unit 500, the residue hydrocracker can run at higher conversions (+8-15%) producing more material as final transportation fuel product. The solid asphaltene stream 61 from unit 60, along with stream 502 from the residue hydrocracking unit 500, can be sent to the gasification unit 600 for hydrogen generation.

As in FIG. 3, the benefits of adding the integrated unit in FIG. 4 may include: maximum yield of incoming crude to plant debottlenecking, if existing, or reduction of coking unit size; debottlenecking, if existing, or reduction of residue hydrocracking size; debottlenecking, if existing, or reduction of gasification unit size; overall carbon footprint reduced for complex.

The integrated process in FIG. 2 can also can help sweet, low complexity (hydro-skimming) refiners take heavier, cheaper crudes which are more readily available, and thus reposition assets to capture more value. The integrated process can be placed at the front of the refinery to provide the initial conditioning of the heavier crude.

Operating Conditions Comparison

The novel arrangement and features of the integrated process of the invention may provide an opportunity to operate in a region not previously possible in any specific prior art process thereby creating a technically feasible and economically favourable/superior solution for treating heavy hydrocarbons down to API's of 0. With DAO volume yields in the 89-91% range and with solvent losses less than 2%, this low complexity integrated process, resulting in low operating and capital costs, creates an economical (based on rates of return) solution to create a pipeline ready and refinery feedstock. Table 4 provides a comparison of some representative existing patents with the present invention. The items in bold indicate conditions that directly limit or disadvantage the prior art when compared to process 10. None of the compared technologies achieve the same yields as the illustrated process for heavy hydrocarbon feeds in the 0 to 7 API density range. The comparison includes integrated cracker and SDA units, and also SDA only schemes. Since this invention borrows some concepts of a thermal cracker process outlined in U.S. Pat. No. 7,976,695 for part of its operation, a comparison to thermal cracker processes is not provided. Of note in Table 4, the unique combination of operating conditions for the thermal cracker allows for a simplification of the SDA that can run with a unique combination of operating conditions and the use of an inertial separator handling strictly asphaltene solids and solvent vapour.

light gas formation keeps a majority of the hydrocarbons (>90% of crude barrel) as desirable product. Asphaltenes have also been converted from "sticky" molecules to "crunching" molecules. The modified asphaltene rich stream, at API densities of −7 to 0, can be processed in a simplified SDA process with a novel combination of operating conditions. A single extraction step and a low pressure solvent stripper with an inertial solids separator may be all that is needed to obtain the stated high yields. As shown in Table 5, the solvent to oil mass ratio can be in the range of 2 to 4:1 for preferred solvents in the C6 and C7 range. The temperature in the single extraction column is well below critical, as is the pressure. At these low operating conditions, energy use is greatly reduced, and a single low pressure stripper is only needed. There is a lot less physical equipment of less expensive materials and configurations required, making the overall investment cost lower than other concepts.

Solvent Choice

To be technically viable while meeting economic objectives, the solvent for deasphalting heavy crude (less than 2 API) needs to be heavy enough (high enough molecular weight) to just precipitate out the necessary asphaltenes while keeping the DAO in solution with the solvent. Also, the sol-

TABLE 4

Comparison of Operating Conditions

| Conditions | MEG HI-Q | Zhao 7597794 Example 6 | Zhao 7597794 | Zheng et al 2007/0125686 | Lutz 4454023 | KBR 8048291 | KBR-Rose 7749378 | Kerr-McGee 5009772 |
|---|---|---|---|---|---|---|---|---|
| Arrangement | Cracker to SDA | SDA only | SDA only | Cracker to SDA | Cracker to SDA | SDA to cracker | SDA only | SDA only |
| Thermal Cracker | | | | | | | | |
| Style | controlled | — | — | Visbreaker | Visbreaker | Visbreaker | — | — |
| Feed to Thermal Cracker (API) | 0-9 | — | — | ? | ? | — | — | — |
| Temperature of reactor (° F.) | 675-775 | — | — | 662-932 | 850-920 | — | — | — |
| Pressure of reactor (psig) | 0-40 | — | — | 43-2175 | 250 | — | — | — |
| Residence Time (min) | 40-180 | — | — | 60-360 | 16-26 | — | — | — |
| Sweep Gas (scf/bbl) | 20-80 | — | — | — | — | — | — | — |
| Heat Flux in Reactor (BTU/hr sqft) | 7000-12000 | — | — | — | — | — | — | — |
| SDA | | | | | Gearhart 4239616 | | | |
| Feed to SDA (API) | −5 to 0 | 2.00 | 2+ | ? | ? (>>0, VB coke) | 5-30 | 2-15 | ? |
| Asphalt ext temp (° F.) | 320-400; Tc−(40-130) | 374.00 | 176-482 | 50-392 | 200-550 | TC+(60-270)# | <450° F. | Tc−(41-68) |
| asphalt ext press (psig) | 200-400; Pc−(40-240) | 580.00 | 435-1450 | 29-1450 | 125-900 | Pc+(0-100)* | 275-1000 | Pv to >Pc |
| Solvent choice | C6-C7 | C6 | C4-C6 | C3-C5 | C3-C9 | C3-C7 | C3-C8 | C3-C6 |
| solvent to oil ratio | 2-4:1 M | 4.65:1 M | 1.72-7.02:1 M | 3-12:1 V | 2-20:1 M | 2-100:1 | 1-10:1 M | 4-20:1 V |
| Extraction steps in SDA | min. 1 | 2/3 | 2/3 | ? | ? | 2/3 | 2/3 | min 3 |
| DAO Yield (%) | 89-90 | 62/83.5 | 62/83.5 | ? | ? | ? | ? | ? |
| Solvent Recovery (%) | over 98% | over 80% | over 80% | ? | ? | ? | ? | ? |

With this integrated process, crudes in the API range of 0-12+ can be processed reliably. In addition, the SDA unit 50 can accept feeds with an API in the range of −5 to 0 reliably. The use of sweep gas (not used in other similar processes), a uniform heat flux (not maintained in other processes), low operating pressures and temperatures allow for mild, favourable reactions to shift heavier hydrocarbons to the light gas oil range suitable for pipeline transport along with the existing hydrocarbons in this range. Minimal coke formation, and vent must be light enough to flash during the transfer of the asphalt extractor bottoms (solid asphaltenes plus solvent) without requiring large quantities of energy. Similarly, the operating temperature has to be cool enough to encourage DAO solubility in the solvent and warm enough so there is enough heat to flash the solvent during transport of the solid asphaltenes. For this process, solid asphaltene precipitation out of solution is mostly insensitive to solvent selection. Table 5 provides a comparison of the solvents to be considered when processing heavy viscous hydrocarbons (−7 to 0 API to the SDA). C6 and C7 provide a high yield (89-91%) and with the reduced complexity of the process creates a novel and economically viable process.

TABLE 5

Solvent selection

| Solvent | Solids Separation in Extractor | Required DAO removal in extractor | Desired Flash during Solids Transport | Economic Solvent to Oil Ratio |
|---|---|---|---|---|
| C4 | Yes | No | Yes | No |
| C5 | Yes | No | Yes | No |
| C6 | Yes | Yes | Yes | 2.5-4 |
| C7 | Yes | Yes | Yes | 2-3 |

Based on the similar effectiveness of C6's and C7's to separate out asphaltenes, a blend of these hydrocarbons can be considered to reduce costs. A rough fraction of transport diluent can be extracted and considered for use as the solvent in the SDA. Testing has confirmed that a mixture of C5-C8 (>60% C6's and C7's) can be a low cost option when sourcing Solvent for the process 10 operation. This further reduces the operating cost of the process through sourcing readily available solvents ordinarily characterized as diluent for the feed to the process.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

GLOSSARY OF TERMS USED IN THIS APPLICATION

Applicant submits the following to assist the reader in interpreting this patent application. Of course, these definitions do not replace common and ordinary meanings for these terms as would be understood by a person nominally skilled in the art of the invention, and are meant as an aid, and to disambiguate meanings where more than one may exist for similar terms.

Asphaltene—asphaltenes are the material in crude oil that is (1) insoluble in n-pentane (or n-heptane) at a dilution ratio of 40 parts alkane to 1 part crude oil and (2) re-dissolves in toluene.

Bitumen—shares the attributes of heavy oil but is yet more dense and viscous. Natural bitumen is oil having a viscosity greater than 10,000 cP and an API typically <10.

Bottoms—Crude Material that does not vaporize in the mentioned thermal cracker. Primarily consists of gas oil, resins and asphaltenes.

Canadian Bitumen—crude oil with gravity API <10 from Canadian resources.

Canadian Heavy Crudes—comprises of both conventional heavy oil and bitumen with API <20.

Deasphalted oil (DAO)—Portion of heavy oil that has majority of asphaltenes removed with a boiling range of nominally 500+° F.

Gas oil—portion of any crude oil that boilings in the range of 520-1000° F.

Heavy oil—is an asphaltic, dense (low API gravity <20 API), and viscous oil (limit of 100 cP) that is chemically characterized by its content of asphaltenes (very large molecules incorporating most of the sulfur and perhaps 90 percent of the metals in the oil).

Light ends—Hydrocarbon that consists of 5 carbon chains and less, typically comprising of pentanes, pentylenes butanes, butylenes, propane, propylene, ethane, ethylene and methane Includes all material found in crude oil and bitumen with Boiling points below 100° F. at atmospheric conditions.

MCR means micro carbon residue.

Resin—Portion of Heavy Oil that is in the 800+° F. boiling range and can contain asphaltenes.

SDA means "solvent deasphalter" or "solvent deasphalting" and refers typically to a SDA unit, which is a processing apparatus (or step) for solvent deasphalting (removal of asphalt from a process fluid using solvent).

Syngas—a gaseous mixture primarily comprised of hydrogen, methane, carbon monoxide, and contaminants generated from the destructive distillation of hydrocarbons.

Topped crude oil—A portion of the crude stream remaining after the removal by distillation or other means of an appreciable quantity of the more volatile components of crude petroleum (eg. Light ends).

What is claimed is:

1. An optimizable, integrated process for producing a pipeline- or refinery-ready feedstock and a dry thermally-affected asphaltene solid from heavy, high asphaltene feedstock process fluid, said process comprising:
   (a) Pre-Heating a process fluid in a heater to a designed temperature;
   (b) Moving the pre-heated process fluid to a reactor, and optimally converting asphaltenes in the process fluid within the reactor to produce a first stream of thermally affected asphaltene-rich fraction(s), and a second stream of vapour;
   (c) Separating the second stream of vapour into a third stream of non-condensable vapour and a fourth stream of lighter liquid hydrocarbon(s);
   (d) Deasphalting the first stream's thermally affected asphaltene-rich fraction by precipitating solid asphaltenes particulate as a result of mixing a solvent comprising at least one C4-C8 solvent with the first stream, in a solvent extraction process which operates at temperatures in a range between 40 and 130 Fahrenheit degrees below the critical temperature of the solvent in the process, which produces a fifth stream of heavy deasphalted oil (DAO) and a sixth stream of concentrated asphaltene which is a solid at the extraction process' operating temperature range, the sixth stream as a mixture of precipitated particulate asphaltene solids in a portion of the liquid solvent;
   (e) Blending the fifth stream's heavy DAO and the fourth stream's liquid hydrocarbon to become the pipeline- or refinery-ready feedstock; and (f) Separating the sixth stream of concentrated asphaltene using a separation unit into a seventh stream of dry, solid asphaltene particulate, and an eighth stream of solvent for re-use in the process.

2. The process of claim 1 as a continuous process where the reactor is a single thermal conversion reactor with an overhead partial condenser operating within the following parameters:
   (a) A uniform heat flux of between 7000-12000 BTU/hr sqft introduced to the process fluid within the reactor;
   (b) A sweep gas of between 20-80 scf/bbl (gas/process fluid) is introduced within the reactor;
   (c) Residence time of the process fluid within the reactor of between 40-180 minutes;
   (d) A substantially uniform operating temperature of between 675-775° F. in the reactor;
   (e) A near atmospheric operating pressure of <50 psig in the reactor.

3. The process of claim 1 as a continuous process where the deasphalting is performed by a mixer, a simple asphalt extractor and a low-pressure DAO/solvent recovery stripper operating with following parameters:
   (a) Solvent in the C5-C8 range;
   (b) Solvent to oil mass ratio in the range of 2-4:1; and
   (c) Asphalt Extractor operating pressure in the range of the solvent's critical pressure minus 40 to 240 psig.

4. The process of claim 1 where step (f) uses an inertial separator.

5. The process of claim 1 where the feed to the process has an API in the range of 0-12 with a resulting feed to the deasphalting step having an API in the range of −8 to 0, and a resulting feed of dry solid asphaltene to an inertial separator which asphaltene exists as a solid when at a temperature in at least the range between the deasphalting steps' operating temperature and up to temperatures above 700° F.

6. An optimizable, integrated process for producing a pipeline- or refinery-ready feedstock and a dry thermally-affected asphaltene solid from heavy, high asphaltene feedstock process fluid, said process comprising:
   (a) Pre-Heating a process fluid in a heater to a designed temperature;
   (b) Moving the pre-heated process fluid to a reactor, and optimally converting asphaltenes in the process fluid within the reactor to produce a first stream of thermally affected asphaltene-rich fraction(s), and a second stream of vapour;
   (c) Separating the second stream of vapour into a third stream of non-condensable vapour and a fourth stream of lighter liquid hydrocarbon(s);
   (d) Deasphalting the first stream's thermally affected asphaltene-rich fraction with by precipitating solid asphaltenes as a result of mixing a solvent with the first stream, in a solvent extraction process into which produces a fifth stream of heavy deasphalted oil (DAO) and a sixth stream of concentrated asphaltene as a slurry of asphaltene solids in the solvent;
   (e) Blending the fifth stream's heavy DAO and the fourth stream's liquid hydrocarbon to become the pipeline- or refinery-ready feedstock; and
   (f) Separating the sixth stream of concentrated asphaltene in an inertial separation unit into a seventh stream of dry, solid asphaltene, and an eighth stream of solvent for re-use in the process,
   where the solvent is a fraction taken from diluent used to transport a bitumen.

7. A process for producing pipeline-ready or refinery-ready feedstock from heavy hydrocarbons using a high-performance solvent extraction process with high local solvent-to-process fluid ratios yet maintaining low overall solvent-to-process fluid ratios, by first performing mild thermal cracking on the heavy hydrocarbons and then separating asphaltene-rich fractions from a resulting thermally affected fluid so that the high solvent-to-oil ratio portion of the process acts only on those asphaltene-rich fractions, to produce a dry, asphaltene particulate by precipitation, the asphaltene particulate being a solid at the operating temperatures of the solvent extraction process, as an end-product.

8. The process of claim 7 where the processing of the heavy hydrocarbons to segregate asphaltene-rich fractions for extraction processing is done by including the heavy hydrocarbons in a process fluid, heating the process fluid to a desired temperature, moving the process fluid into a reactor, and managing at least one of temperature, in-reactor residence-time, heat flux, pressure and sweep gas in the reactor to produce the asphaltene-rich fractions for further processing, to produce a dry, solid asphaltene as an end-product.

9. A process for producing pipeline-ready or refinery-product and a dry thermally-affected asphaltene solid from heavy high feedstock using low overall ratios of solvent-to-asphaltene-rich fractions by:
   (a) Pre-heating a process fluid which includes the feedstock to a desired temperature, moving the process fluid into a reactor, and managing:
      (i) temperature, within a range of 675-775° F.;
      (ii) in-reactor residence-time;
      (iii) uniform heat flux;
      (iv) pressure less than 50 psig; and
      (v) sweep gas
      in the reactor to perform mild thermal cracking on the feedstock to produce a thermally affected asphaltene-rich fluid, and other process product to be used in the pipeline-ready or refinery-ready product;
   (b) causing the precipitation of asphaltenes from the thermally affected fluid in a high local but low overall solvent-to-asphaltene-rich-fraction ratio process where the asphaltenes produced are a solid particulate at the temperature ranges of this step, the temperature ranges being below the critical temperature of a solvent comprising at least one C4-C8 solvent, and separating the solids from the remaining fluid; and
   (c) using inertial separation to produce the dry thermally-affected asphaltene solid.

10. The process of claim 6 where the solvent from diluent is in the range of C5-C8 hydrocarbons.

11. The process of claim 7 where the operating temperature of the solvent extraction process is below the solvent's critical temperature minus between 40 and 130° F.

* * * * *